May 10, 1960
R. G. BRENT
2,935,849
HYDRAULIC CONTROL SYSTEM
Filed July 18, 1957
2 Sheets-Sheet 1
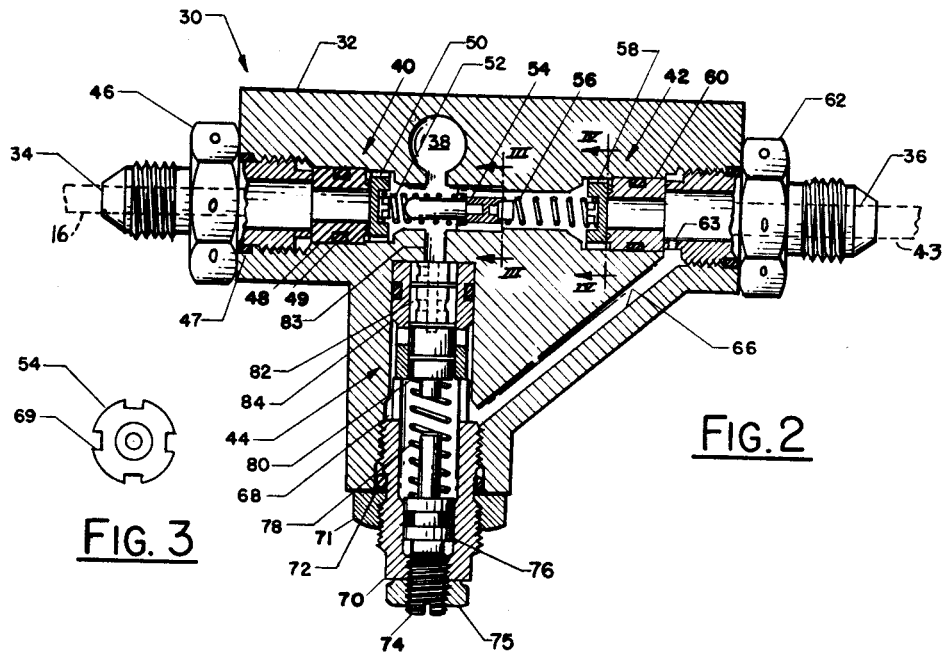
FIG. 2
FIG. 3
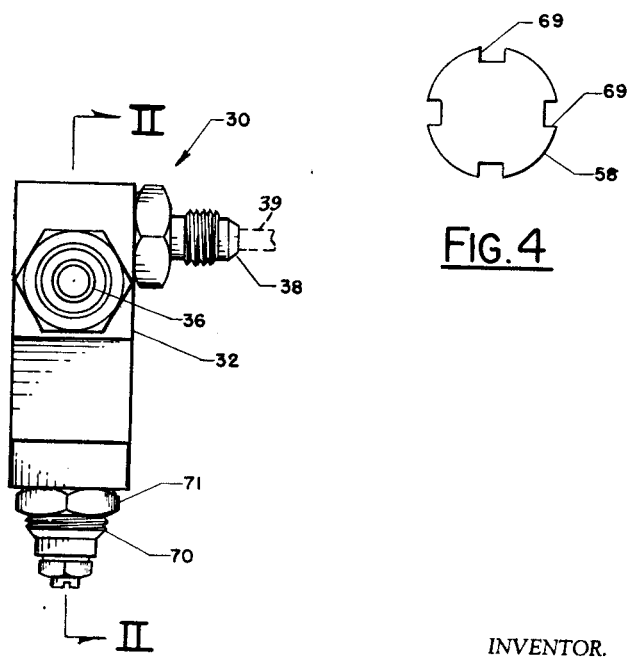
FIG. 4
FIG. 1
INVENTOR.
ROBERT G. BRENT
BY
Beau, Brooks, Buckley + Beau
ATTORNEYS May 10, 1960 R. G. BRENT 2,935,849
HYDRAULIC CONTROL SYSTEM
Filed July 18, 1957 2 Sheets-Sheet 2
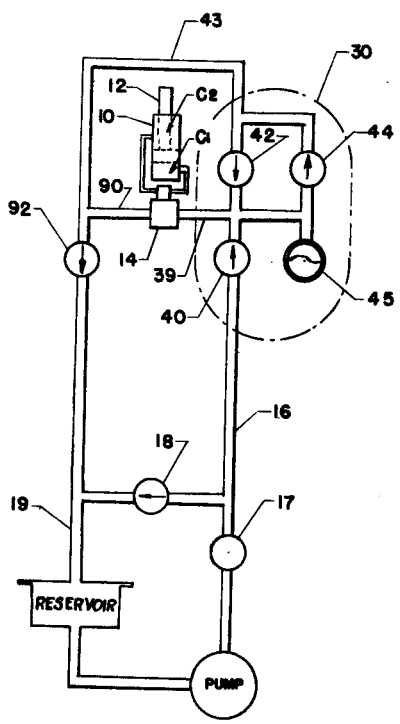
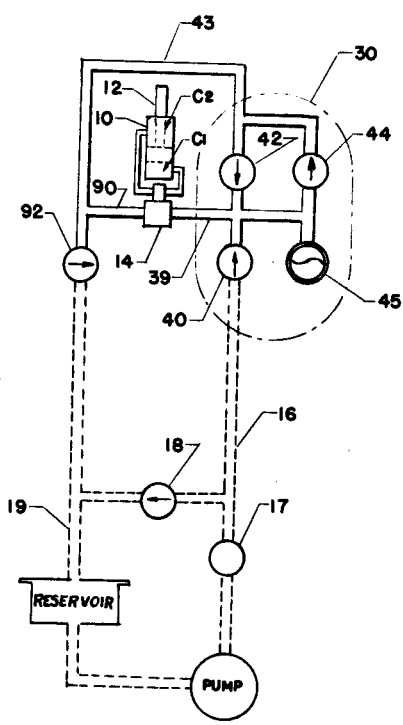
INVENTOR.
ROBERT G. BRENT
BY
Beau, Brooks, Buckley & Beau.
ATTORNEYS United States Patent Office 2,935,849
Patented May 10, 1960

2,935,849

HYDRAULIC CONTROL SYSTEM

Robert G. Brent, Arlington, Tex., assignor to Bell Helicopter Corporation, Fort Worth, Tex.

Application July 18, 1957, Serial No. 672,619

6 Claims. (Cl. 60—51)

This invention relates to aircraft flight control means, and more particularly to hydraulic flight control systems and improved control valve means therefor.

It is an object of the present invention to provide a novel and improved control valve component for use in conjunction with a helicopter flight control hydraulic servo-mechanism, which is adapted to transmit control commands to the rotor attitude control system in improved manner.

Another object is to provide an improved control component as aforesaid, which also is adapted to more effectively resist feed-back forces from the rotor blade pitch control system.

Another object is to provide a control component as aforesaid which is operable automatically upon failure of the aircraft hydraulic system, to convert the system to manual control in improved manner.

Another object is to provide a system as aforesaid which will continue to function satisfactorily in spite of failures of certain components such as the hydraulic pressure supply, thereby obviating necessity for provision in an aircraft of standby duplicate hydraulic systems such as have been heretofore required.

Another object is to provide a component as aforesaid which is of structurally simplified and fool-proof form, and relatively inexpensive to manufacture and maintain.

Other objects and advantages of the invention will appear from the specification hereinafter wherein:

Fig. 1 is an end elevational view of a valve component of the present invention;

Fig. 2 is a longitudinal sectional view thereof, taken along line II—II of Fig. 1;

Fig. 3 is a view, on enlarged scale, of an integral part of the valve, taken about along line III—III of Fig. 2;

Fig. 4 is a view, on enlarged scale, of another integral part of the valve, taken about along line IV—IV of Fig. 2; and Figs. 5–6 illustrate schematically an example of adaptation of the component of the invention to a helicopter rotor attitude control system; showing the system in "automatic" and "manual" operations, respectively.

As shown in Figs. 5–6, the valve device of the invention is particularly adapatable for control of a helicopter rotor blade pitch control system as for example through the medium of a hydraulic piston-cylinder unit or "jack" as indicated at 10 having an "output" piston rod 12. In such case application of hydraulic pressures to the piston rod 12 may be controlled by a servo-valve as indicated at 14. Note that in Figs. 5, 6, a single sub-system including a hydraulic actuator 10 is shown in conjunction with the pressure supply system, such as might be connected to any desired flight control means of the aircraft wherein the loads are such as to require use of a hydraulic boost system. But it will be understood that any number of such sub-systems for control of other components of the aircraft may be similarly employed in conjunction with the pressure supply system.

The pressure supply system is illustrated to include a pump drawing fluid from a reservoir and delivering it into a conduit 16 including a filter 17 and a shunt conduit and pressure relief valve combination 18 permitting return of the pressure fluid to the reservoir through a return conduit 19 when the rest of the system is blocked off as will be explained hereinafter. For example, when the hydraulic servo-mechanism system is operative, pressured fluid flows into the irreversible valve component of the present invention which is indicated generally at 30. As illustrated in Figs. 1–2 each irreversible valve component 30 of the invention conveniently comprises a body portion 32 having a pressure inlet conduit connection port 34, a return line connection port 36, and a port 38 connectible to a conduit 39 leading to the corresponding servo-valve 14 hereinabove referred to.

As shown schematically in Figs. 5, 6, each irreversible valve component 30 includes a first check valve 40; a second check valve 42; a relief valve 44; and a pressure accumulator 45. As illustrated in greater detail in Figs. 1–4, the pressure inlet port 34 comprises part of a nipple 46 which screw threads into the valve body 32 and is pressure-sealed by means of a gasket 47. The nipple 46 backs up an annular valve seat 48 which is also pressure-sealed by means of an O ring 49. A disk shaped valve 50 bears against the inner end of the seat 48, and is spring-pressed thereagainst by means of a compression spring 52 which is backed up by means of a spring stop member 54 bearing at its other end against a compression spring 56 which in turn engages a second disk shaped valve 58 bearing against an annular valve seat 60 corresponding to the valve seat 48 at the opposite side of the device. Similarly, the return port portion 36 conveniently comprises part of a nipple 62 which threads into the valve body 32 to back up the annular valve seat 60, as in the manner of the assembly of the parts 46, 48.

As shown, the inner end of the nipple 62 is furnished with passage 63 to permit flow of fluid from interiorly of the annulus 60 into a drain passageway 66 leading into a vertical bore 68 housing the relief valve device 44. As shown in Figs. 3, 4, the stop 54 and the valve disks 50, 58, are each provided with peripheral grooves 69 permitting flow of fluid therethrough when the valve disks 50, 58, are displaced away from the valve seats 48, 60. The valve bore 68 receives in threaded relation a sleeve 70 which is fixed by means of lock nut 71 and gasket 72 in fluid sealing relation relative to the bore 68. At its lower end the sleeve 70 receives in vertically adjustable relation an abutment device 74 comprising a threaded screw portion and a lock nut 75 and a piston portion 76 which in turn backs up a compression spring 78. At its other end the spring 78 supports a spool valve 80 the upper end 82 of which is bored longitudinally and radially in registry with port 83 leading from the chamber 38. Hence, adjustment of the screw 74 regulates the operation of the relief valve unit 80, as will be explained hereinafter.

To explain normal operation of the system first assume that the pilot controls the servo-valve 14 so as to force the cylinder piston 12 to move upwardly as viewed in Figs. 5, 6, for corresponding control of the rotor blade pitch adjustment mechanism. Such motion of the piston 12 will cause return fluid from the cylinder 10 to flow through conduit 90 into the reservoir return conduit 19. A directional relief or check and shut off valve as indicated at 92 is provided in the return line beyond each servo-valve. If on the other hand the pilot controls the servo-valve so as to cause the cylinder piston to move downwardly, fluid from the pressure line 16 passes through the check valve 40, and return fluid from the cylinder 10 passes through the directional relief valve 92 to the reservoir. Hence, during normal operation of the hydraulic servo-mechanism system in either direction, the hydraulic fluid is blocked from flowing from pressure conduit 16 directly to conduit 43 and return conduit 19 by check valve 42. The pressure relief valve 44 is previously adjusted to open at a pressure substantially greater than the system supply pressure, and hence the valve 44 is normally inactive.

However, in event of a failure of the aircraft hydraulic supply system resulting in loss of normal pressure, the check valve 40 closes and relief valve 92 also closes, thereby retaining fluid within the sub-system including the cylinder 10. That is to say, a loss of pressure in the supply system will, by virtue of the positive pressure in the sub-system, automatically close the check valve 40 and prevent the loss of fluid through this valve. In so far as the valve 92 is concerned, any conventional construction may be utilized for this purpose, such valve being operative to remain in proper condition to act as a relief valve so long as there is a positive pressure in the supply system but acting to completely shut off should the supply pressure drop to zero. This condition is shown more clearly in Figs. 5 and 6, Fig. 5 showing the entire system in full lines and illustrating the valve 92 as being in operative condition therewithin, to act as a relief valve, and Fig. 6 showing in dotted lines, that part of the system which has become damaged or destroyed to the extent that the supply pressure is no longer present and with the valve 92 consequently having automatically conditioned itself to act so as to completely block off the return line and prevent the loss of fluid from the sub-system including the cylinder 10. Any load from the rotor blade pitch control system imposed upon the piston rod 12 and attempting to force the rod to move downwardly for example will then cause a slight displacement of the servo-valve 14 downwardly. As will be seen from Figs. 5 and 6, the piston rod 12 is connected directly to the servo-valve 14 so that there is both a hydraulic and a mechanical connection between the piston rod and the valve. Because of the mechanical load from the rotor, pressure in the chambers $C_1$ and $C_2$ of jack 10 would vary, depending on the direction of the load imposed. At the same time, fluid is prevented from moving backwards down the pressure line by check valve 40 and is blocked to the return line by check valve 42. As long as the rotor load is sufficiently low, relief accumulator combination valve 45—44 remains inactive. The accumulator 45 and relief valve 44, when combined, are adjusted so that if loads imposed on piston rod 12 do not cause pressures say for example in excess of 325 p.s.i. against the check valves 40 and 42 and against the relief accumulator combination valve 45—44, the accumulation of fluid in the combination valve 45—44 reduces the sharp peaks of the surging pressures. If these loads become sufficiently high so as to cause pressures in excess of the cracking pressure of the combination valve 45—44 fluid under the pressure due to load imposed on piston 12 will alternate between chambers $C_1$ and $C_2$, depending on the direction of the load. Fluid flow through the relief accumulator valve combination 45—44 (past spool 80 through ports 68, 66) will then be great enough to cause a displacement of the piston rod of jack 10 to such a degree that feedback forces will be felt by the pilot at the stick. This signals the operator to refrain from maneuvers or high speeds that can cause such loads from the rotor.

For example, a rotor load reacting on the jack 10 and attempting to force the piston rod thereof upwardly (Figs. 5, 6), actuates the servo-valve 14 to permit flow of system pressure to the actuator 10. Operation of the self sustained limited irreversible valve is therefore similar to the preceding description.

The descriptions hereinabove explained operation of the self sustained limited irreversible valve with the stick in a static position fixed by the pilot. If the hydraulic system is in a condition of no pressure, that is with the system in a condition as indicated in Fig. 6 wherein the pump is incapable of supplying pressure to the system, and the pilot wishes to make a control correction or maneuver which involves upward movement of the motor piston, the following happens.

The pilot causes the servo-valve 14 to be displaced in one direction by movement of his control stick and applies the force necessary to move the controls. $C_1$ (Fig. 6) will then be open to the pressure line and $C_2$ to the return line. Pressure in $C_2$ increases as a result of the pilot-applied load. Fluid flows out the return port of the servo-valve 14. Insofar as the hydraulic pressure generated by the pilot for the design limit velocities of control displacement is lower than a preselected pressure such as for example 30 p.s.i., directional relief valve 92 remains closed and prevents fluid returning to reservoir. Fluid therefore passes through crossover line 43 and enters $C_1$ through check valve 42 and servo-valve 14. The cracking pressure of check valve 40 is adjusted to be much greater than that of check valve 42, and therefore check valve 40 always remains closed and will not permit fluid from the pressure line to enter the self sustained limited irreversible valve or the hydraulic cylinder. If the pilot causes the servo-valve 14 to be displaced by movement of the controls in the opposite direction, operation of the system occurs in a similar way but in the opposite direction.

By virtue of the fact that fluid cannot enter or leave the hydraulic cylinder through the pressure or return lines 16, 19, respectively, of the hydraulic system when the system is in a no pressure condition as shown in Fig. 6, the hydraulic cylinder is completely independent of the pump and reservoir of the hydraulic system while in the no pressure condition, and is irreversible to the degree desired and permits safe transition from pressure "on" to pressure "off" operation. It should be pointed out that pressure "off" operation is defined as being any case resulting in loss of pressure, even to the extent of total destruction of the hydraulic system up to, but not including the hydraulic cylinder 10; the self sustained irreversible valve 30; the crossover line 43, and the additional directional relief valve 92.

Thus, it will be appreciated that the aircraft control system of the present invention features a self-sufficient unit or sub-system initially powered by an external hydraulic pressure supply, but which is competent to continue its intended control functions subsequent to failure of the pressure supply portion of the system. Also, it will be appreciated that in event of any such failure of the supply system, the control components of the unit automatically adjust to the new condition to provide to the pilot adequate control means without requiring the pilot to be aware of the changed situation and/or to manipulate any transition control device or the like. Furthermore, it will be appreciated that by virtue of the irreversible nature of the valve 30 of the sub-system, it is at all times fully resistant to any feed-back forces, whereby the pilot at all times retains adequate control of the aircraft.

I claim:

1. An aircraft control mechanism comprising in combination, a hydraulic actuator adapted to be coupled to control mechanism, a hydraulic pressure supply, and a sub-system comprising a servo-valve connected to said actuator to regulate flow of pressured fluid thereto from said supply, said servo valve having a fluid inlet port and a return fluid outlet port, a pilot control operably coupled to said servo-valve for control adjustments of the latter, and an irreversible automatically operable hydraulic valve means having a fluid inlet port coupled to said supply and a first fluid delivery port coupled to said servo-valve fluid inlet port and a second fluid inlet port coupled to said return fluid outlet port of said servo valve, a return line interconnecting said return fluid outlet port of said servo-valve and said pressure supply, and a differential pressure actuated valve disposed in said return line to said supply to permit flow of fluid therethrough when pressure within the sub-system including the irreversible valve, the servo-valve and the actuator is equal to the pressure in the supply system, said differential valve being automatically displaced to its closed position whenever the pressure within said supply system falls below the pressure within said sub-system, whereby failure of hydraulic pressure in said supply system will cause said sub-system to automatically isolate itself from said supply system whereby pilot manipulation of said servo-valve will continue to procure control responses by means of said actuator.

2. A control mechanism comprising in combination, a hydraulic actuator adapted to be coupled to a control means, a hydraulic pressure supply system, and a sub-system comprising a servo-valve connected to said actuator to regulate flow of pressured fluid thereto from said supply system, said servo-valve having a return fluid outlet port, a control operably coupled to said servo-valve for control adjustments of the latter, and an irreversible automatically operable hydraulic valve means having a fluid inlet port coupled to said supply system and a first fluid delivery port coupled to said servo-valve and a second fluid inlet port coupled to said return fluid outlet port of said servo-valve, a return line interconnecting said return fluid outlet port of said servo-valve and said pressure supply system, and a differential pressure actuated valve disposed in said return line to said supply to permit flow of fluid therethrough when pressure within said sub-system is equal to the pressure in said supply system, said valve being automatically operable to closed position whenever the pressure within said supply system falls below the pressure of said sub-system, whereby failure of hydraulic pressure in said supply system will cause said sub-system to automatically isolate itself from said supply system.

3. A control system comprising in combination, a hydraulic actuator coupled to control means, a hydraulic pressure supply, and a sub-system control means comprising a servo-valve connected to said actuator to regulate flow of pressured fluid thereto from said supply, said servo-valve having a return fluid outlet port, a control operably coupled to said servo-valve for control adjustments of the latter, an automatically operable irreversible hydraulic valve means having a fluid inlet port coupled to said supply and a first fluid delivery port coupled to said servo-valve and a second fluid inlet port coupled to said return fluid outlet port of said servo-valve, a return line interconnecting said return fluid outlet port of said servo-valve to said pressure supply, and a differential pressure actuated valve disposed in said return line to said supply to permit flow of fluid therethrough when pressure within the sub-system including said irreversible valve means and said servo-valve and said actuator is equal to said pressure in the supply system, said differential valve being adjusted so as to be automatically displaced to its closed position whenever the pressure within said supply system falls below the pressure within said sub-system, whereby failure of hydraulic pressure in said supply system will cause said sub-system to automatically isolate itself from said supply system and whereby manipulation of said servo-valve by said control will then continue to procure control responses by means of said actuator.

4. A control mechanism comprising in combination, a hydraulic actuator adapted to be coupled to control means, a hydraulic pressure supply means, and a control system comprising a servo-valve connected to said actuator to regulate flow of pressured fluid thereto from said supply means, a control operably coupled to said servo-valve for control adjustments of the latter, said servo-valve having a return fluid outlet port, and an automatically operable hydraulic valve means having a fluid inlet port coupled to said supply means and a first fluid delivery port coupled to said servo-valve and a second fluid inlet port coupled to said return fluid outlet port of said servo-valve, a return line interconnecting said return fluid outlet port of said servo-valve to said pressure supply means, and a differential pressure actuated valve disposed in said return line to permit flow of fluid therethrough when pressure within said control system is equal to the pressure in said supply means, said valve being adjusted so as to be automatically operable to closed position whenever the pressure within said supply means falls below the pressure of said control system, whereby failure of hydraulic pressure in said supply means will cause said control system to automatically isolate itself from said supply means.

5. A control assembly comprising in combination, a hydraulic jack adapted to be coupled to control means, a hydraulic pressure supply system, and a control system including a servo-valve connected to said jack to regulate flow of pressured fluid thereto from said supply system, said servo-valve having a return fluid outlet port, a control operably coupled to said servo-valve for controlled adjustments of the latter, and an irreversible automatically operable hydraulic valve means having a fluid inlet port coupled to said supply and a fluid delivery port coupled to said servo-valve and a second fluid inlet port coupled to said return fluid outlet port of said servo-valve, and means including a differential pressure actuated valve interconnecting said control system and said supply system and permitting flow of fluid therethrough when pressure within said control system including said irreversible valve and said servo-valve and said actuator is equal to the pressure in said supply system, said differential valve being automatically operable to closed position whenever the pressure within said supply system falls below the pressure of said control system, whereby failure of hydraulic pressure in said supply system will cause said control system to automatically isolate itself from said supply system whereby manipulation of said servo-valve by said control will continue to procure control responses by means of said jack.

6. A control system comprising in combination, a hydraulic actuator coupled to a control means, a hydraulic pressure supply, and a sub-system control means comprising a servo-valve connected to said actuator to regulate flow of pressured fluid thereto from said supply, said servo-valve having a return fluid outlet port, a control operably coupled to said servo-valve for control adjustments of the latter, an automatically operable hydraulic valve means having a fluid inlet port coupled to said supply and a first fluid delivery port coupled to said servo-valve and a second fluid inlet port coupled to said return fluid outlet port of said servo-valve, a return line interconnecting said return fluid outlet port of said servo-valve to said pressure supply, and a differential pressure actuated valve disposed in said return line to said supply to permit flow of fluid therethrough when pressure within said sub-system including said automatically operable valve means and said servo-valve and said actuator is equal to the pressure in said supply system, said differential valve being adjusted so as to be automatically displaced to its closed position whenever the pressure within said supply system falls below the pressure within said sub-system, whereby failure of hydraulic pressure in said supply system will cause said sub-system to automatically isolate itself from said supply system and whereby manipulation of said servo-valve by said control will then continue to procure control responses by means of said actuator.

References Cited in the file of this patent

UNITED STATES PATENTS

| | | |
|---|---|---|
| 2,239,566 | Mercier | Apr. 22, 1941 |
| 2,396,984 | Broadston et al. | Mar. 19, 1946 |
| 2,427,939 | Woods | Sept. 23, 1947 |
| 2,446,149 | Wells | July 27, 1948 |
| 2,618,243 | Treganowan | Nov. 18, 1952 |
| 2,804,753 | Leduc | Sept. 3, 1957 |

UNITED STATES PATENT OFFICE
Certificate of Correction

Patent No. 2,935,849  May 10, 1960

Robert G. Brent

It is hereby certified that error appears in the above numbered patent requiring correction and that the said Letters Patent should read as corrected below.

In the drawings, Sheet 2, Figs. 5 and 6 should appear as shown below instead of as in the patent:

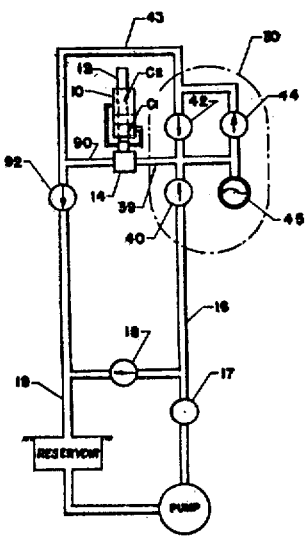 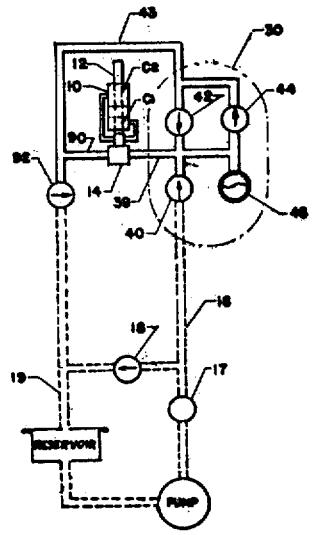

Signed and sealed this 25th day of July 1961.

[SEAL]

Attest:

ERNEST W. SWIDER,

*Attesting Officer.*

DAVID L. LADD,

*Commissioner of Patents.*